United States Patent
Smith

(10) Patent No.: US 7,337,701 B2
(45) Date of Patent: Mar. 4, 2008

(54) SLIDING TABLE FOR WORKBENCH

(76) Inventor: Darrin Eugene Smith, 124 Big Bay Point Road, Barrie, Ontario (CA) L4N 9B4

( * ) Notice: Subject to any disclaimer, the term of this patent is extended or adjusted under 35 U.S.C. 154(b) by 268 days.

(21) Appl. No.: 10/901,203

(22) Filed: Jul. 29, 2004

(65) Prior Publication Data

US 2005/0056132 A1    Mar. 17, 2005

(30) Foreign Application Priority Data

Jul. 31, 2003   (CA)   .................... 2436301

(51) Int. Cl.
*B26D 7/06*   (2006.01)

(52) U.S. Cl. ............... 83/438; 83/435.12; 83/435.11; 83/522.19

(58) Field of Classification Search ........... 83/435.12, 83/425, 435.11, 435.13, 435.14, 437.1, 448–450, 83/477.2, 581, 438, 440, 432, 468, 468.3, 83/468.7, 522.18, 522.19, 522.25; 144/287, 144/286.5, 286, 286.1; 269/291, 303–306
See application file for complete search history.

(56) References Cited

U.S. PATENT DOCUMENTS

| | | | |
|---|---|---|---|
| 141,975 A * | 8/1873 | Xander | ................... 83/435.14 |
| 457,415 A | 8/1891 | Beck | |
| 868,087 A | 10/1907 | Harrold | |
| 2,856,972 A * | 10/1958 | Bruch | .......................... 83/416 |
| 3,078,129 A * | 2/1963 | Beeck | .......................... 384/19 |
| 3,340,244 A | 9/1967 | Coover et al. | |
| 3,656,390 A | 4/1972 | Hochstatter | |
| 4,089,428 A | 5/1978 | Zlaikha | |
| 4,248,115 A | 2/1981 | Brodbeck et al. | |
| 4,408,509 A | 10/1983 | Winchip | |
| 4,521,006 A | 6/1985 | Waters | |
| 4,974,306 A * | 12/1990 | Cole et al. | ..................... 29/434 |
| 5,016,508 A * | 5/1991 | Hallenbeck | .............. 83/435.13 |
| 5,116,249 A | 5/1992 | Shiotani et al. | |
| 5,201,863 A * | 4/1993 | Peot | ........................... 83/432 |
| 5,722,308 A * | 3/1998 | Ceroll et al. | .................. 83/438 |
| 6,112,785 A | 9/2000 | Yu | |
| 6,148,705 A | 11/2000 | Shieh | |
| 6,508,281 B1 | 1/2003 | Wang | |
| 6,688,202 B2 | 2/2004 | Parks et al. | |
| 2003/0213349 A1 | 11/2003 | Chang | |
| 2004/0035273 A1* | 2/2004 | Lee | ......................... 83/435.12 |

* cited by examiner

*Primary Examiner*—Boyer D. Ashley
*Assistant Examiner*—Omar Flores Sánchez
(74) *Attorney, Agent, or Firm*—Birch, Stewart, Kolasch & Birch, LLP

(57) ABSTRACT

The sliding table is used in conjunction with a workbench and includes a panel slidable along a path which is disposed normal to the longitudinal axis of the workbench. The panel has stop points in front and behind the workbench. At each stop point, the panel has an outwardly extending portion which is cantilevered from an outer support and an inwardly extending portion which is prevented from rising by an inner support. Both supports are beneath the panel and are spaced apart from one another.

3 Claims, 12 Drawing Sheets

SLIDING TABLE FOR WORKBENCH

This Non-provisional application claims priority under 35 U.S.C. § 119(a) on Patent Application No(s). 2,436,301 filed in Canada on Jul. 31, 2003, the entire contents of which are hereby incorporated by reference.

FIELD OF THE INVENTION

This invention relates to sliding tables for workbenches such as benches, worktables or any surface that is used for doing mechanical or practical work such as is found on a power saw unit, a router, a drill press and so on. More particularly the invention relates to a sliding table having means for accurately guiding the movement of the table and improved means for supporting a piece of work or stock on the sliding table.

BACKGROUND OF THE INVENTION

Sliding tables for workbenches are known for providing lateral support to a piece of work or stock in front of or behind the workbench. Such tables usually travel on a path which is perpendicular to the longitudinal axis of the workbench. The path extends from in front of the workbench to behind it and, in general, the longer the path, the more useful and versatile the table is. However the table become increasing unstable as the path lengthens. That is because the longer the path, the larger the portion of the table that will be cantilevered when the table is at the ends of its travel. The cantilevered portion is not supported and for that reason is relatively unstable. Any weight on the table may cause the workbench to tip over or may cause the table to bend or fracture.

I have found a way of significantly extending the length of travel of a sliding table while at the same time providing increased support to the table. The way in which I do so involves the use of, among other things, a movable carriage which provides support to the sliding table whether it projects from the front or from the rear of a workbench. Preferably, I also use guide rods or grooved wheels which accurately guide the table while it is sliding so that precise work can be carried out on the table.

SUMMARY OF THE INVENTION

Briefly, the sliding table of my invention is used in conjunction with a workbench having front and rear portions on opposite sides of a longitudinal axis. The sliding table includes a panel slidable along a path which is disposed normal to the axis and which terminates at front and rear stop positions. The panel when at each stop position has an outwardly extending portion which is cantilevered from an outer support and an inwardly extending portion which is prevented from rising by an inner support. The outer and inner supports at each stop position are spaced apart from each other.

DESCRIPTION OF THE DRAWINGS

The sliding table of the invention is described with reference to the accompanying drawings in which.

Like reference characters refer to like parts throughout the description of the drawings.

DESCRIPTION OF PREFERRED EMBODIMENTS

Figure 1:
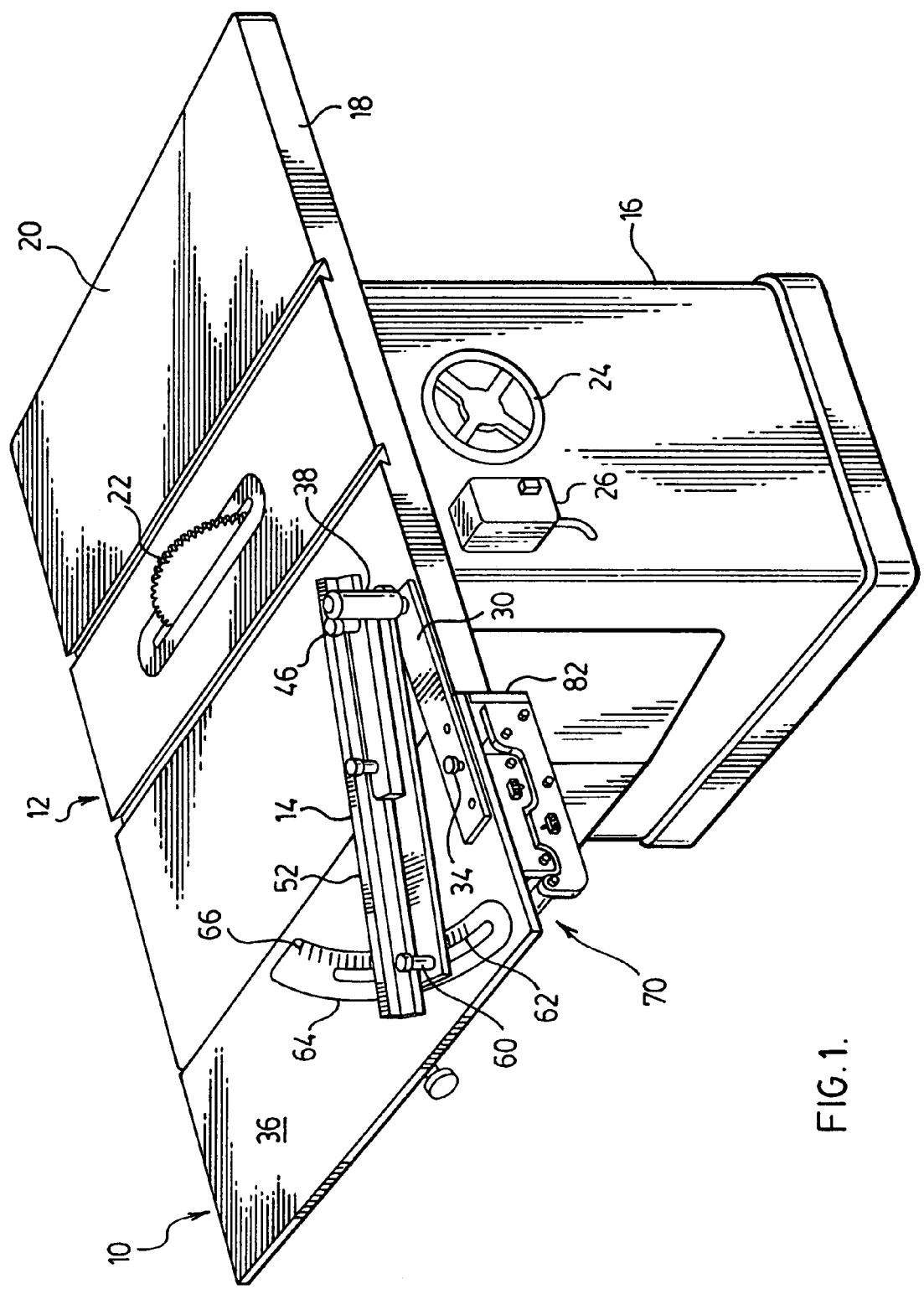
FIG. 1 is a perspective view of the first embodiment of the sliding table in conjunction with a power saw unit and a guide.

With reference to FIG. 1, the sliding table of the invention, generally 10, is shown in conjunction with a power saw unit, generally 12, and a guide 14 for a piece of work or stock. The power saw unit is conventional and consists of a housing 16 and an upper wall 18 having a working surface 20 through which a circular saw blade 22 projects. A circular handle 24 for adjusting the level of the saw blade extends from the side wall of the housing as does an electrical box 26 having an on-off switch.

Figure 3:
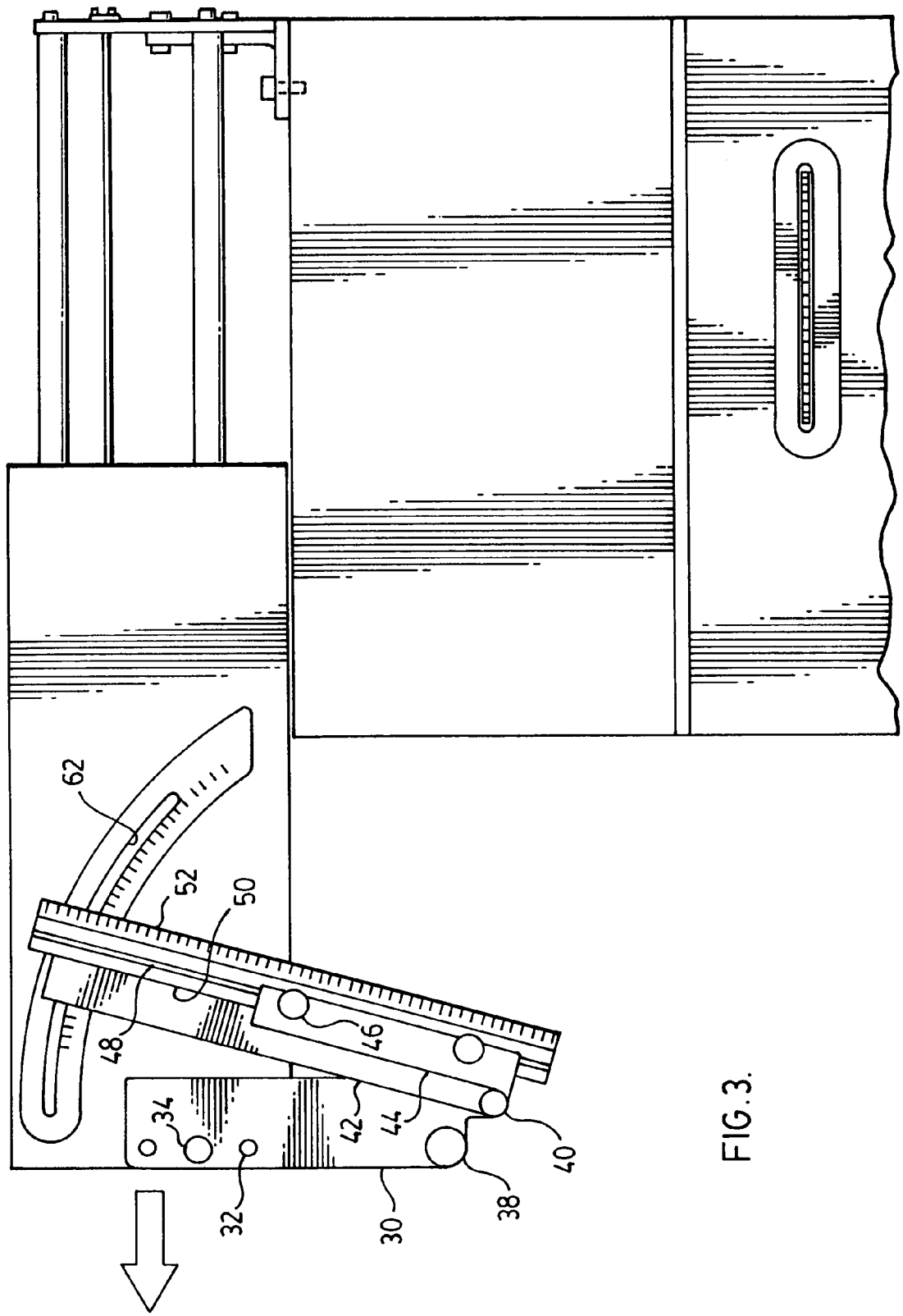
FIG. 3 is a plan view of the sliding table, guide and the upper wall of the power saw unit where the sliding table extends beyond the front of the power saw unit.
Figure 4:
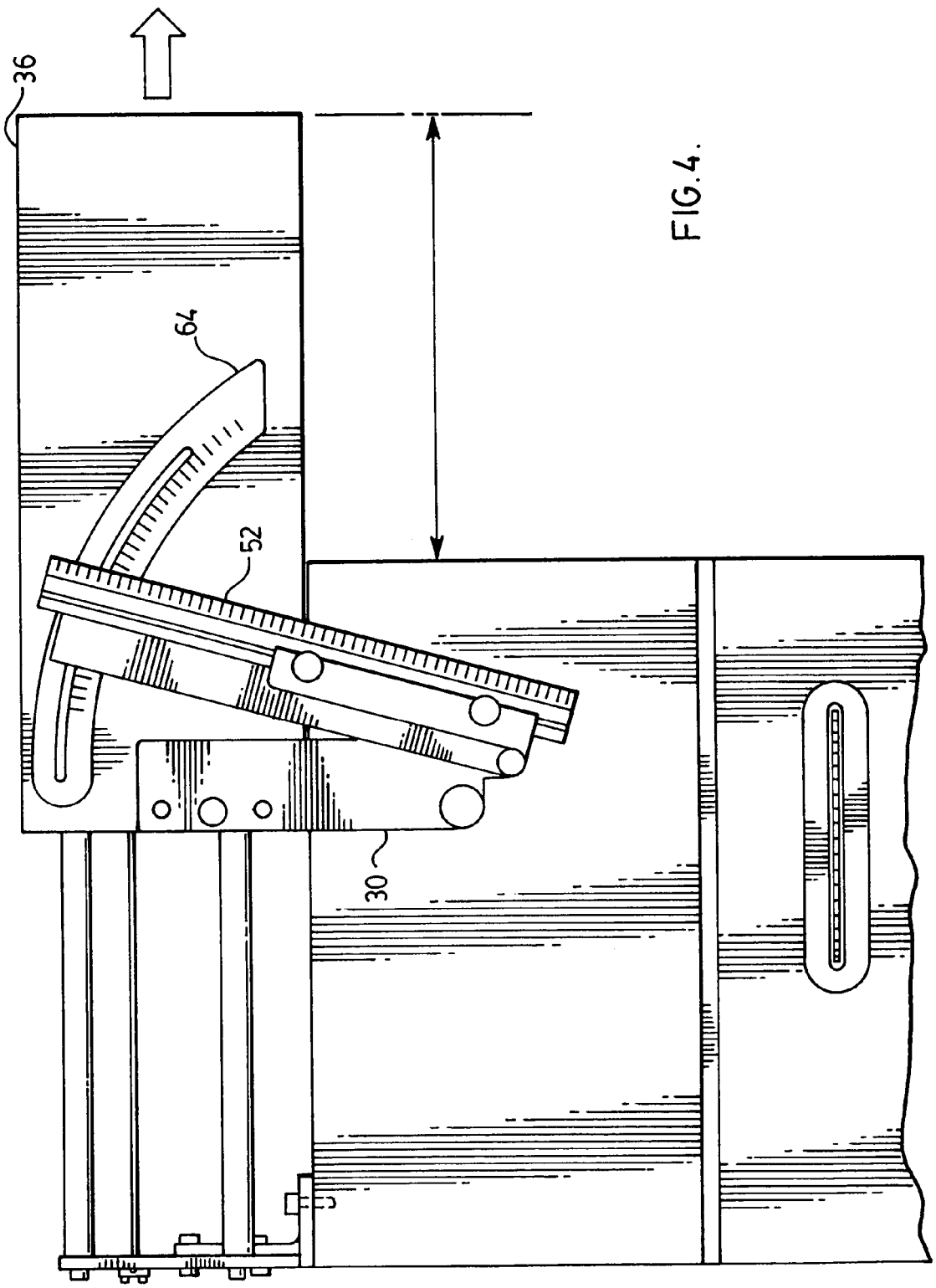
FIG. 4 is the same as FIG. 3 except that guide and the upper wall of the sliding table extends beyond the rear of the power saw unit.

With reference to FIGS. 1 and 3, the guide has base plate 30 having, adjacent to one end, a number of threaded openings 32 through which a threaded pin 34 extends. Threaded openings are also formed in the upper panel 36 of the sliding table for receipt of the pin. The base plate thus can be attached at various preselected positions on the sliding table.

A handle 38 is connected to the base plate adjacent to the end opposite openings 32 to facilitate rotating of the base plate about pin 34. Adjacent to the handle is a pivot 40 for interconnecting the base plate to an arm 42. Attached to the upper wall of the arm is a bar 44 having a pair of knobs 46 connected to threaded shanks. The shanks extend downwardly through threaded openings in the bar and into an elongated T-slot 48 formed in the rear wall 50 of a fence 52.

Each shank connected to knob 46 is held in the slot by means of a nut (not illustrated) which is threadably connected to the end of the shank. As is conventional, the nut is free to slide in the slot but is confined in the slot and cannot exit from it. The nuts thus allow the fence to slide relative to the arm but prevent the fence and arm from separating. The fence may be prevented from sliding by rotating knobs 46 to cause the nuts to move into frictional contact with the upper wall of the T-slot.

Adjacent to the free end of arm 42 is a knob 60 (FIG. 1) having a shank which fits into the arcuate slot 62 of an arc radius 64 formed in the upper panel of the sliding table. As is conventional, the arc radius is provided with a scale 66 which is etched or painted onto the upper surface of the upper panel.

A nut is threaded to the lower end of the shank attached to knob 60 so that the arm may be fixed to the arc radius by tightening the knob in order to draw the nut into contact with the lower surface of the upper panel.

Figure 2:
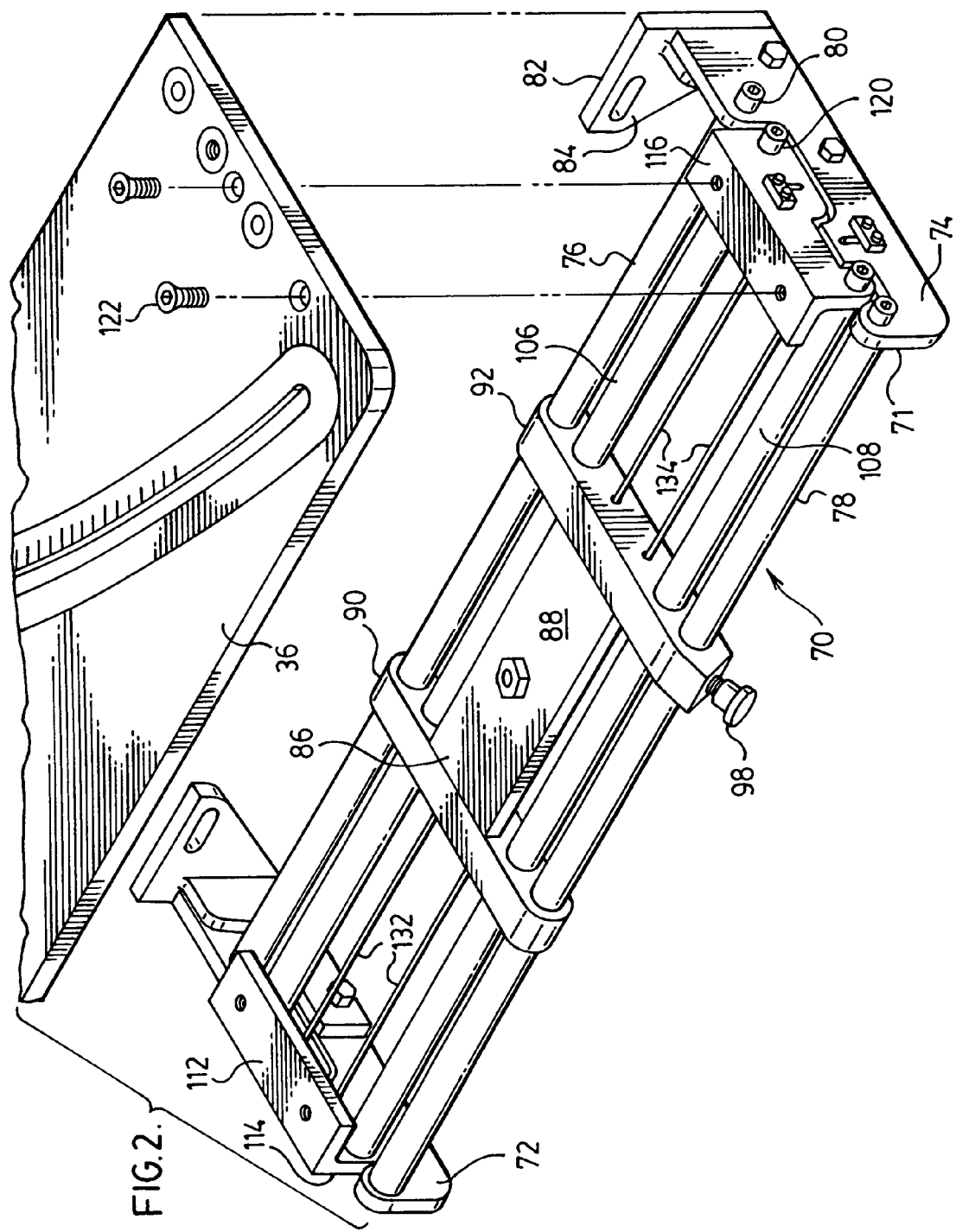
FIG. 2 is a perspective view of the sliding assembly beneath the upper panel of the sliding table.

With reference to FIG. 2, the sliding table has a sliding assembly, generally 70 on which upper panel 36 is seated. The assembly includes a bed 71 having end walls 72, 74 between which two parallel guide rods 76,78 extend. The guide rods are bolted to the end walls by conventional socket head cap screws 80. Each end wall has an ear 82 provided with an elongated slot 84 which receives a bolt for attaching the bed to the upper wall of the power saw unit as illustrated in FIG. 1.

Throughout the disclosure and the claims, the sliding table of the invention is stated to be for use in conjunction with a workbench. The term "workbench" in this context is intended to mean a bench, worktable or any surface that is used for doing mechanical or practical work such as carpentry. Workbench can include that portion of the housing for a power saw that has a surface on which work can be carried out. Working surface 20 of the power saw unit illustrated in FIG. 1 is an example of such a "workbench". In like manner, a housing for other cutters such as a router, drill press and so on similarly provided with a working surface is intended to be covered by the term "workbench".

Figure 8:
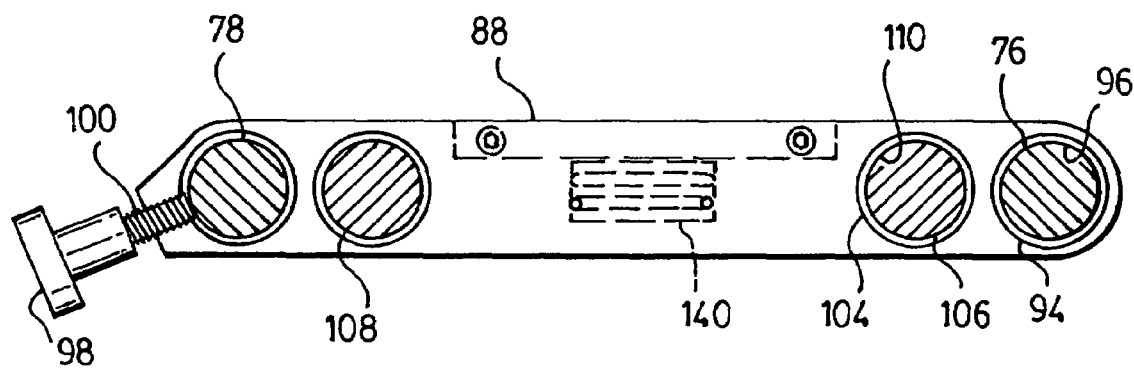
FIG. 8 is an elevation of the side wall of a bearing mount of the sliding assembly.

With reference to FIGS. 2 and 8, mounted for sliding on the two guide rods 76, 78 is a movable carriage 86. The carriage is made up of a central block 88 and two bearing mounts 90, 92. Each bearing mount has openings 94 adjacent to each end for receipt of the two guide rods 76,78. Bushings 96 are provided in each opening so that the carriage is freely slidable on the guide rods. An adjusting knob 98 has a shank 100 which is threadably received in an opening in the bearing mount and terminates just short of guide rod 78. Tightening of knob 98 causes the shank to move into contact with the guide rod thereby preventing the movable carriage from sliding on the guide rods.

The two bearing mounts each have two additional openings 104 through which guide rods 106, 108 extend. Those openings are also provided with bushings 110. The latter guide rods are part of a slider, generally 112, which is made up of the latter two guide rods as well as two right angled end supports 114, 116 at opposite ends of the guide rods. The end supports have vertical and horizontal limbs, the former being attached to guide rods 106,108 by means of socket head cap screws 120 while the latter walls are attached to the upper panel 36 of the sliding table by means of screws 122.

It will be understood that slider 112 is free to slide relative to movable carriage 86 and both are free to slide relative to bed 71. Flexible wire cables 132, 134 coordinate the movements of these three components of the sliding assembly to ensure that the sliding table of the invention operates effectively. To this end and with reference to FIGS. 5-8, one end of cable 132 is connected to end support 114 of the slider and its other end is connected to end wall 72 of the bed. One end of the other cable 134 is connected to end support 116 while its other end is connected to end wall 74. Both cables are trained around a pulley 140 which is mounted for rotation to the lower wall of central block 88.

Figure 5:
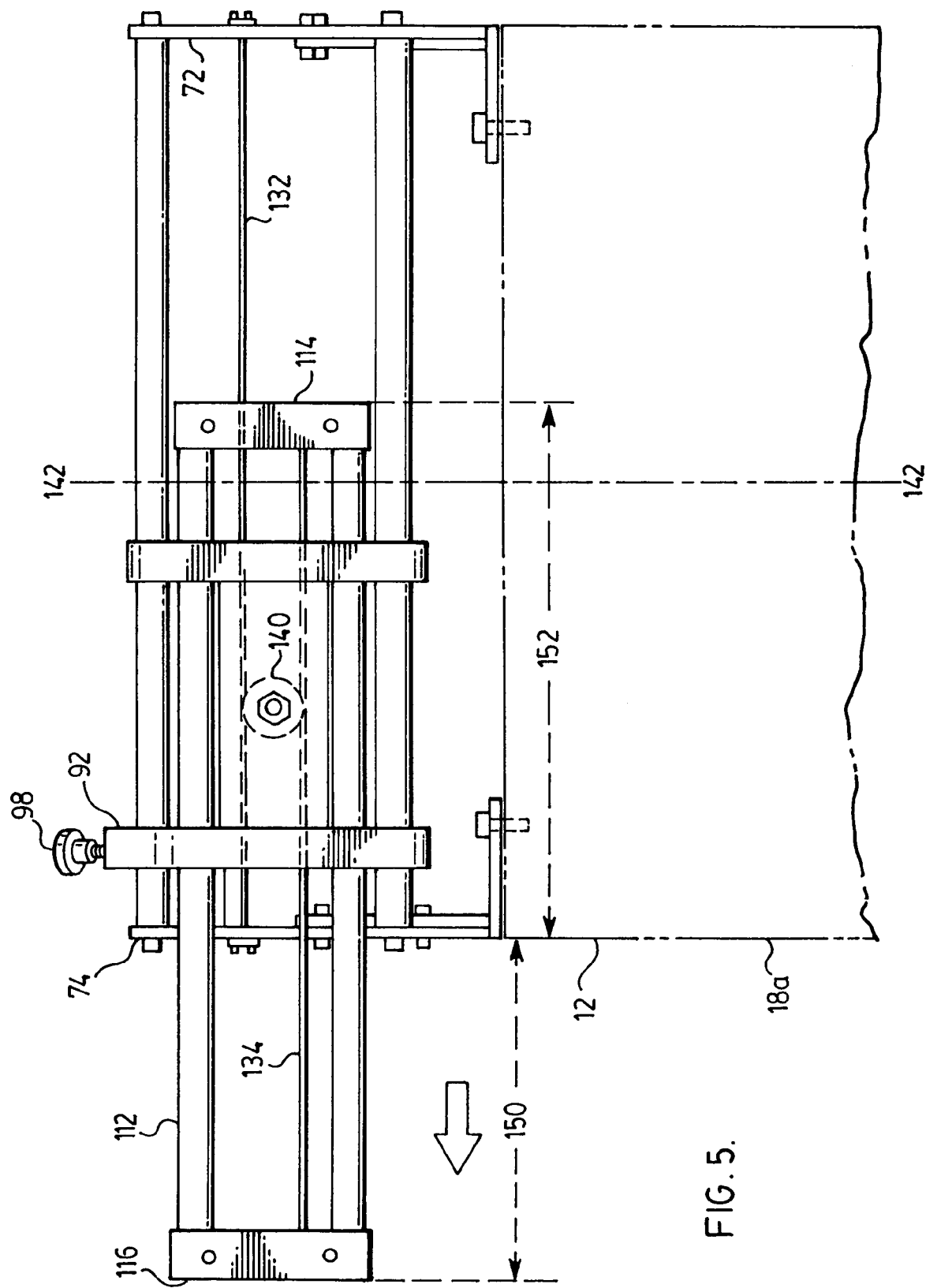
FIG. 5 is a plan view of the sliding assembly where the assembly extends beyond the front of the power saw unit.

In operation, when the upper panel 36 of the sliding table is pulled forward of the power saw unit, the sliding assembly moves to the left as illustrated in FIG. 5. Slider 112 to which the panel is attached also slides to the left in the bearings in the movable carriage. As the slider moves, cable 134 draws pulley 140 to the left but the distance travelled by the pulley is less than that of the slider. The movable carriage also moves to the left since it is attached to the pulley. When bearing mount 92 contacts the end wall 74, no further movement is possible.

Figure 6:
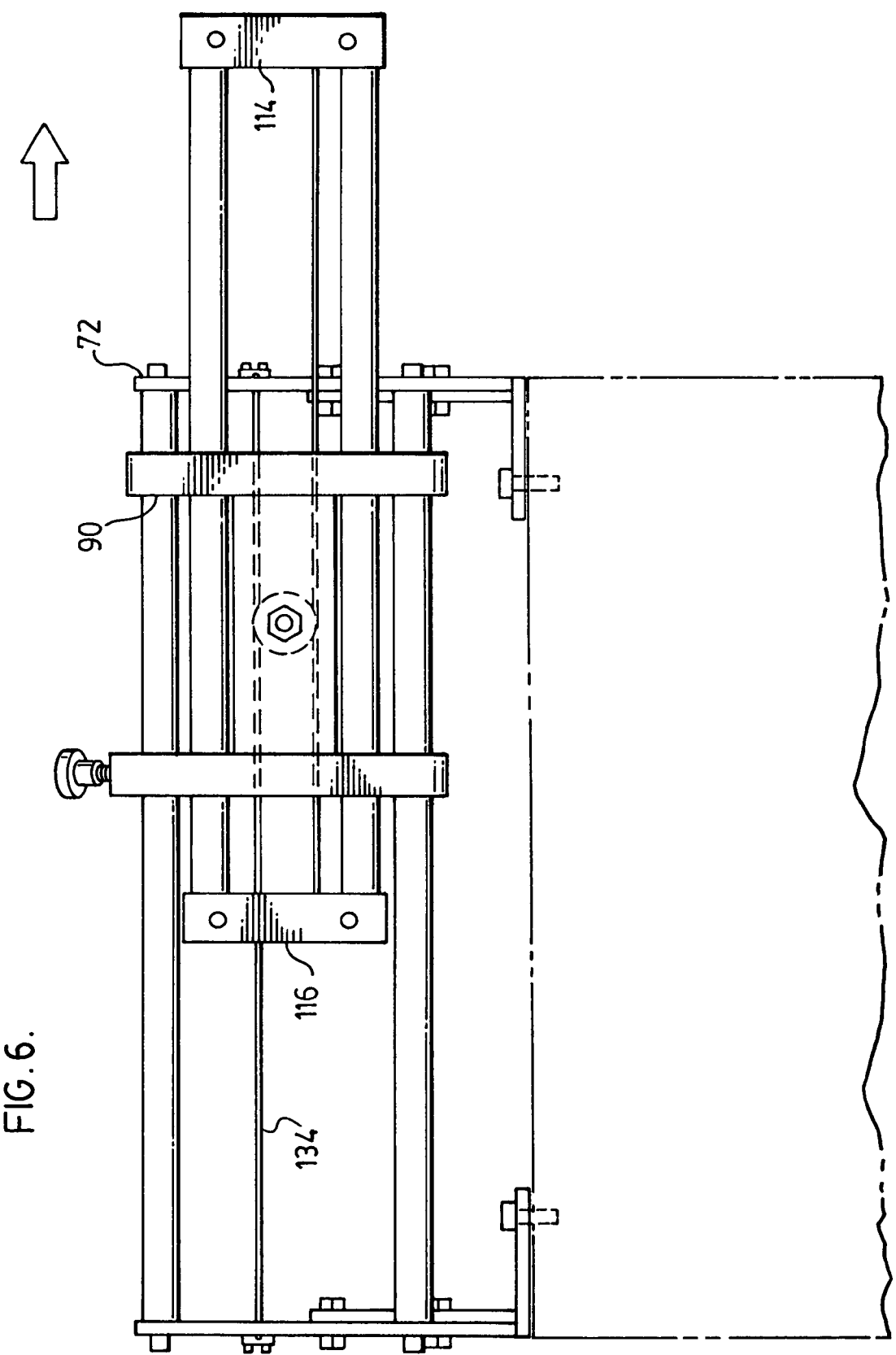
FIG. 6 is the same as FIG. 5 except that the assembly extends beyond the rear of the power saw unit.
Figure 7:
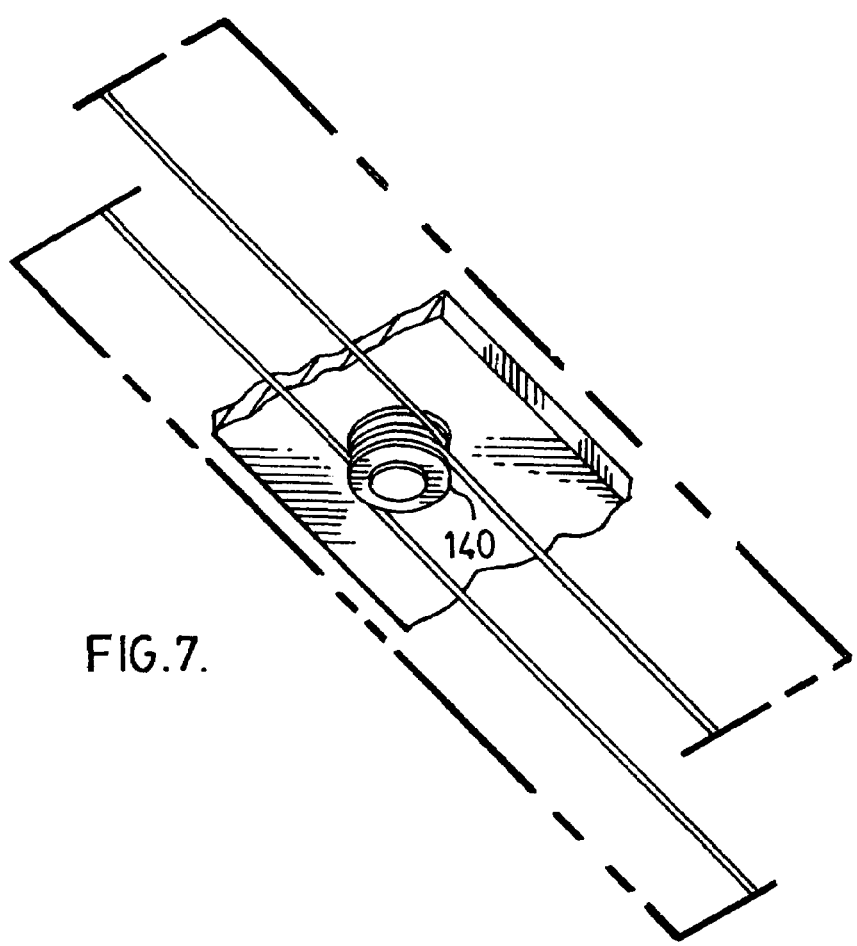
FIG. 7 is a perspective plan view of a pulley and cables of the sliding assembly.

Movement in the opposite direction is illustrated in FIG. 6. In that drawing, when bearing mount 90 contacts end wall 72 of the bed, no further movement is possible.

To further describe the operation of the movable table, it should first be noted that, in general, the front wall of the upper panel will be flush with end support 116 of the slider while the rear wall of the panel will be flush with the rear wall of the other end support 114. The end supports will accordingly indicate the position of the panel in the drawings in which the upper panel is omitted such as FIGS. 5 to 8.

With reference to FIGS. 5 and 6, the upper panel slides between two stop positions, one forward of the power saw unit and the other to the rear. These positions are on opposite side of the longitudinal axis 142-142 of the power saw unit. The path along which the upper panel slides is indicated by the arrows in those figures and that path is normal to the longitudinal axis.

The stop positions are illustrated in FIGS. 5 and 6 except that in both figures, the bearing mounts of the movable table is close but not touching the end walls of the bed. Not until the two touch, will the upper panel have reached a stop position. Assuming they do touch in these figures, the front stop position is illustrated in FIG. 5 while the rear stop position is illustrated in FIG. 6.

When the upper panel is at a stop position, part of it extends beyond the front edge 18*a* of the upper wall of the power saw unit and the remainder is behind that edge. The part that extends beyond the front edge is the part over that portion of the slider marked 150 in FIG. 5. That is the "outwardly extending" portion of the slider. The portion of the slider behind that portion is marked 152 in the same figure and is the "inwardly extending" portion of the slider.

The outwardly extending portion of the slider is cantilevered from an outer support which consists of end wall 74 of the bed and bearing mount 92 of the carriage. The upper panel is also prevented from pivoting upward by an inner support which consists of bearing mount 90 on the carriage. The inner and outer supports are spaced apart from each other by the length of the central block 88 of the movable carriage.

A second embodiment of the sliding assembly of the invention is illustrated in the remaining drawings. The essential difference between this embodiment and the first embodiment in that the carriage and slider rails slide on rails in the second embodiment whereas in the first embodiment they slide on guide rods.

Figure 9:
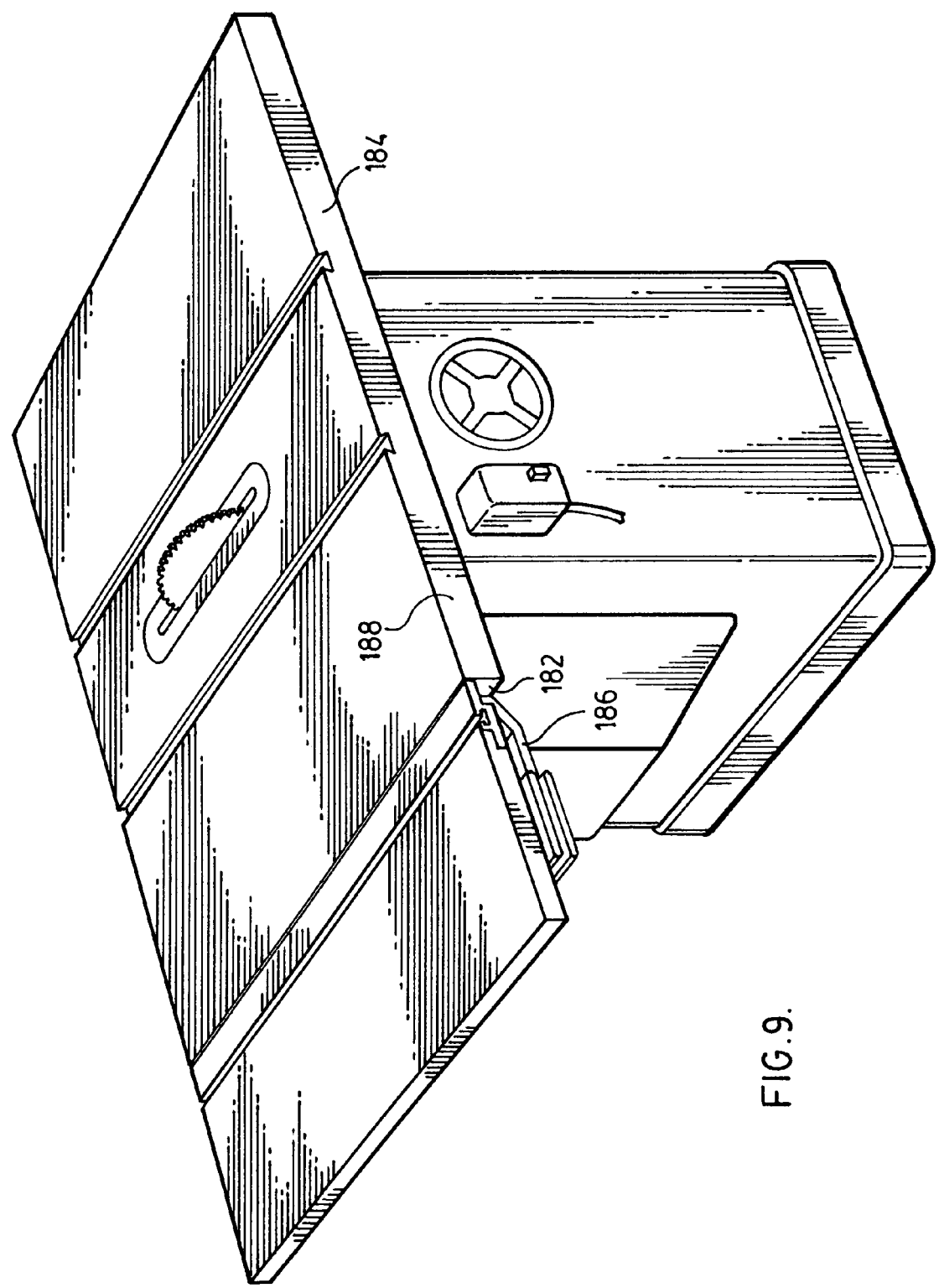
FIG. 9 is a perspective view of a second embodiment of the sliding table in conjunction with a power saw unit.
Figure 10:
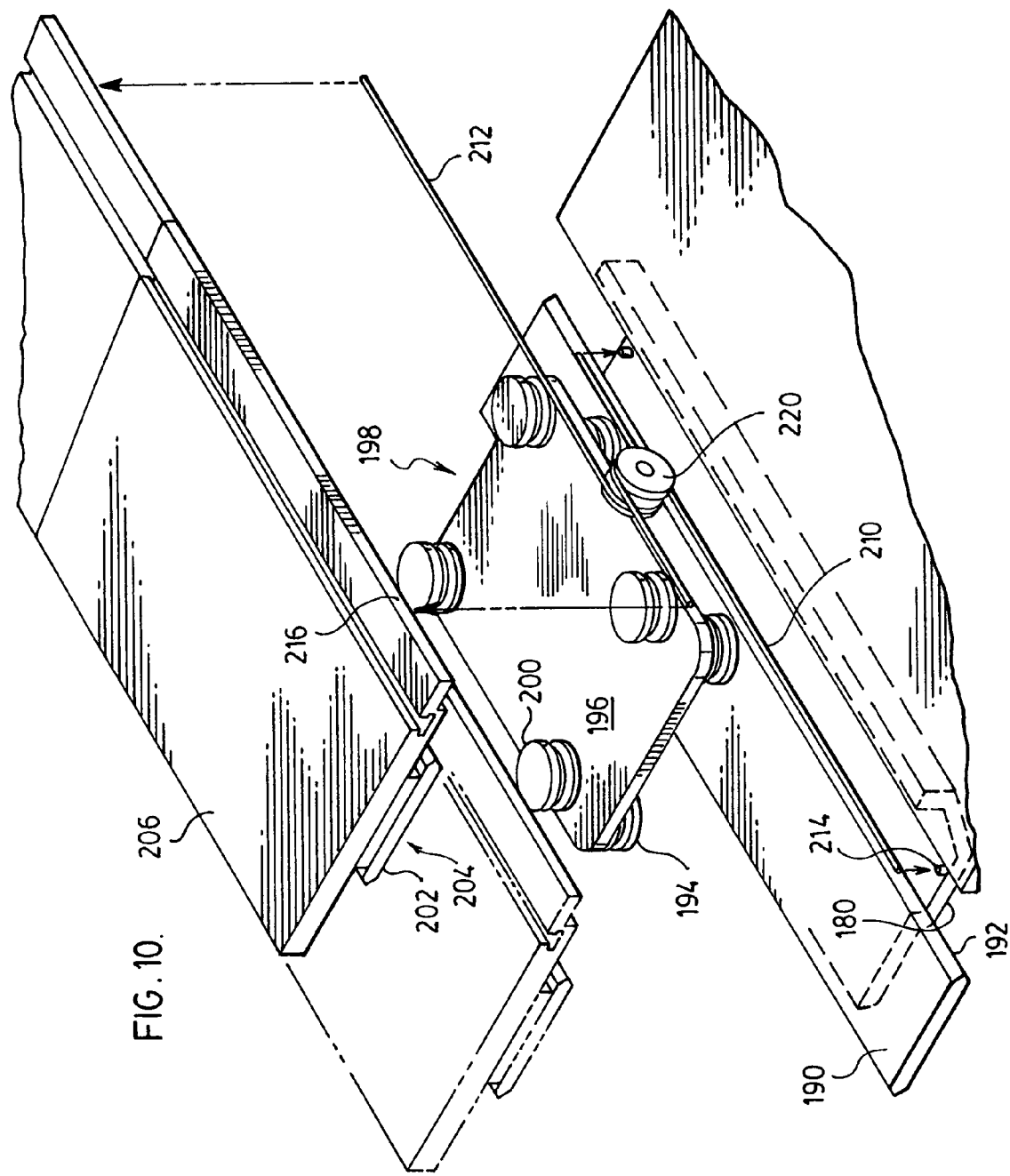
FIG. 10 is a perspective view of the sliding assembly beneath the sliding table together with a portion of the sliding table.
Figure 11:
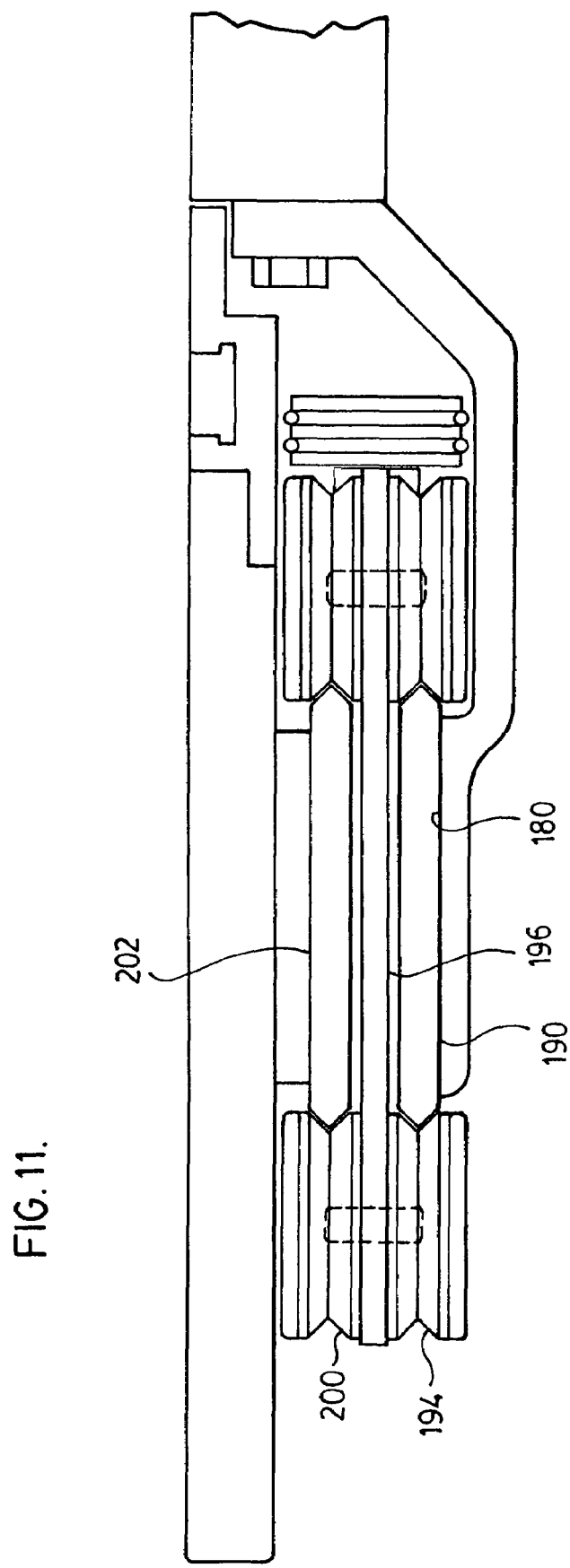
FIG. 11 is an elevation of the sliding assembly from the front of the power saw unit.

With reference first to FIGS. 9, 10 and 11, the assembly has a bed 180 which is bolted to the side edge 182 of a conventional power saw unit 184. The bed has a forward edge 186 which is flush with the forward edge 188 of the power saw unit while the rear edge of the bed (not illustrated) is flush with the rear edge of the power saw unit.

A lower rail 190 is attached to the upper wall of the bed. The rail runs the length of the bed i.e. from its forward edge to its rear edge. Each side edge of the rail tapers to a point 192 which is received in the grooves of wheels 194. The grooved wheels are mounted in bearings for rotation on the lower wall of the central block 196 of a carriage, generally 198. As illustrated in FIG. 10, there is a pair of wheels on each side of the block so that the carriage does not derail as it travels along the lower rail.

Four more grooved wheels 200 are mounted in bearings for rotation on the upper wall of the central block 196. The grooves of those wheels are received in the side edges of an upper rail 202 which, like lower rail 186, has tapered side edges.

The upper rail is part of a slider, generally 204 to which the upper panel 206 of the sliding table is affixed. The slider, like slider 112 of the first embodiment, is free to slide relative to bed 180 and to carriage 198 and the carriage likewise is free to slide relative to the bed.

Flexible wire cables 210, 212 coordinate the movement of the slider and carriage. One end of cable 210 is attached a point 214 adjacent to the forward edge of the bed while the other end is attached at a point 216 adjacent to the forward end of the slider and the upper panel 206. The ends of cable 212 are attached at points adjacent to the rear ends of the slider and the bed. Both cables are trained around a pulley 220 which is mounted in bearings in the side edge of the central block of the carriage.

Figure 12:
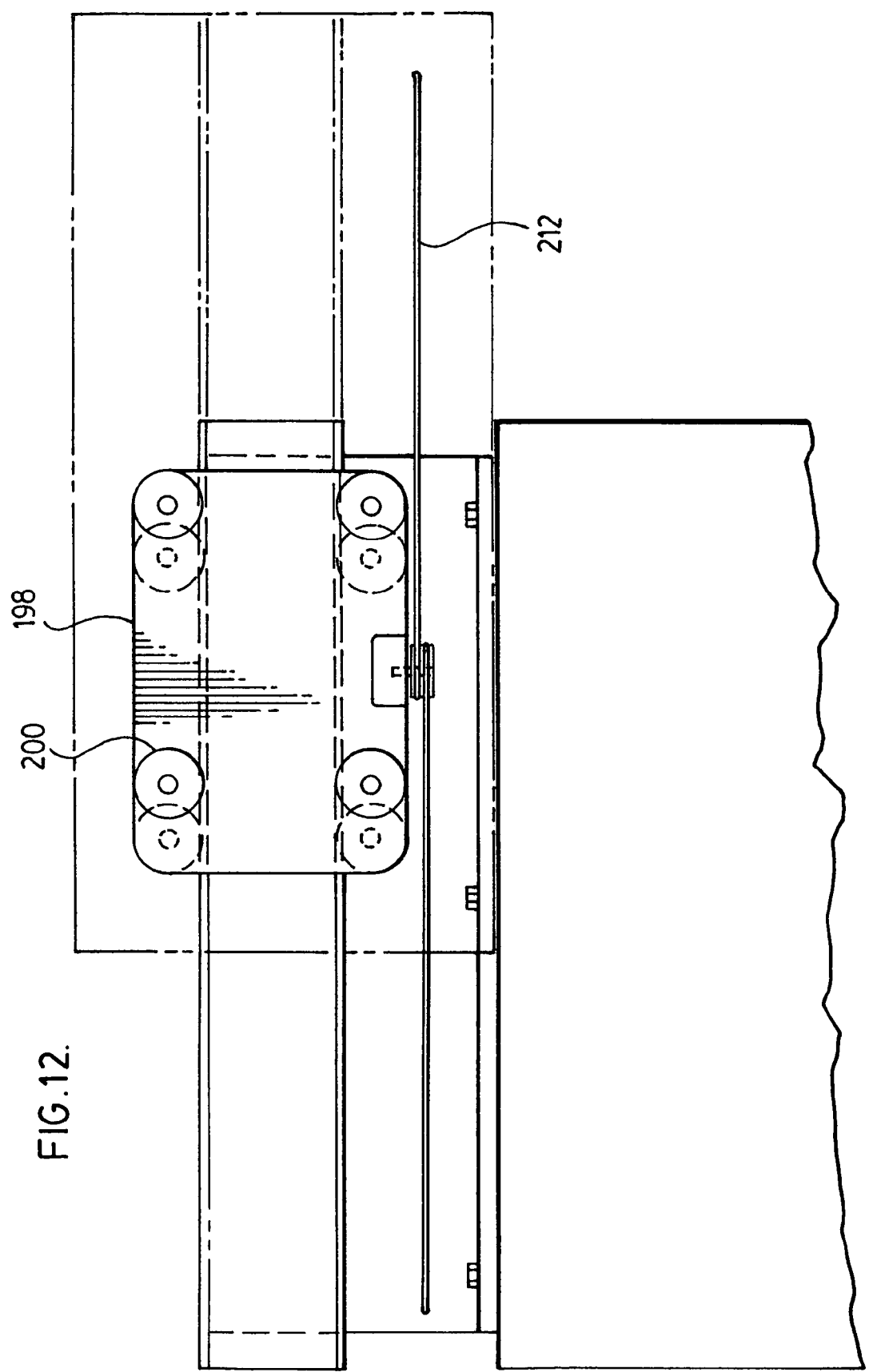
FIG. 12 is a plan view of the upper wall of the sliding assembly.
Figure 13:
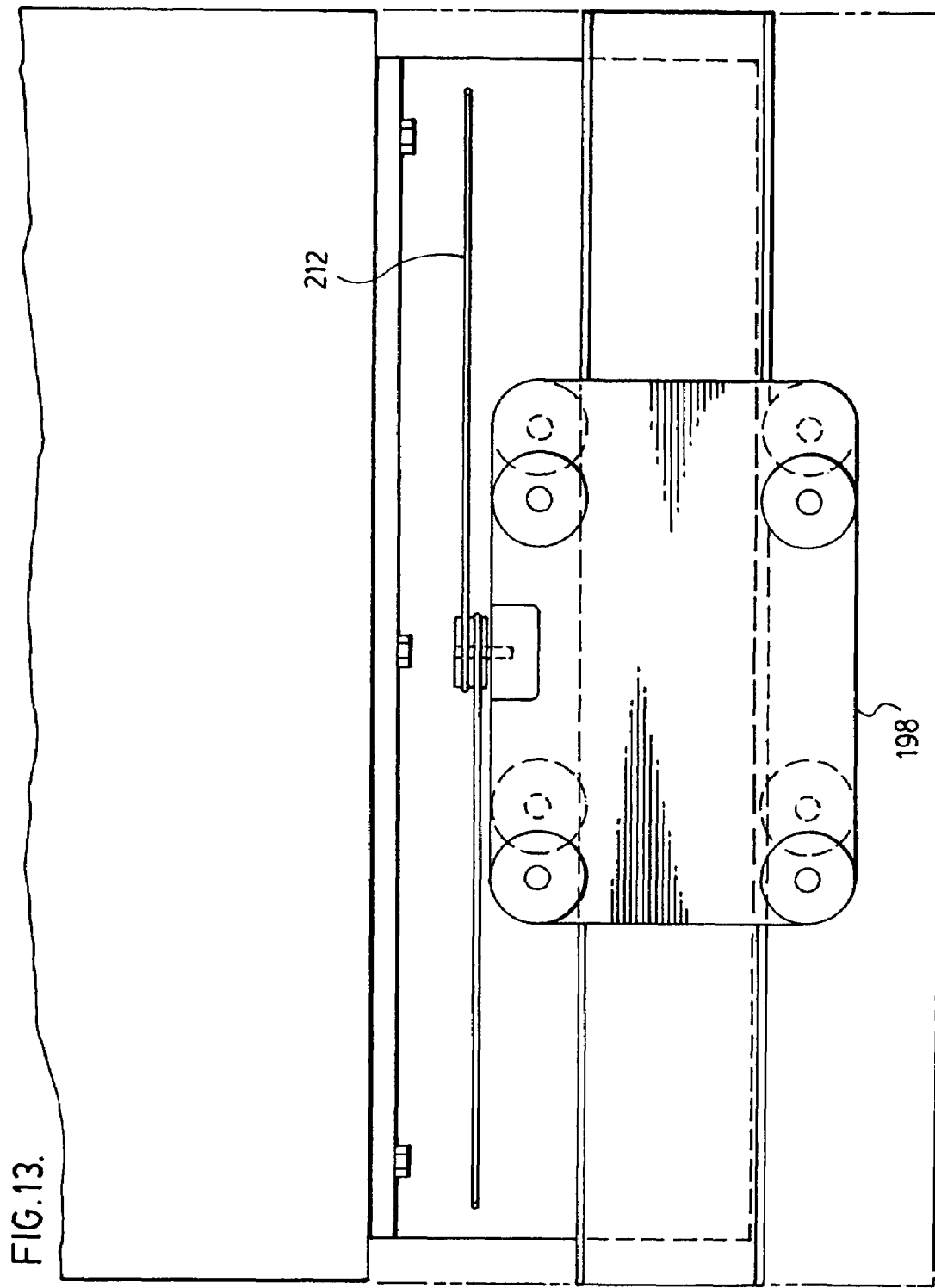
FIG. 13 is a view of the lower wall of the sliding assembly.

In operation, and with reference to FIGS. 12 and 13, when the upper panel of the sliding table is pushed to the rear or right, the sliding assembly moves likewise. The slider to which the panel is attached runs along the grooves in the upper wheels 200 of carriage 198. As the slider moves, cable 212 draws the carriage to the right but a distance less than that of the slider. When the pulley is vertically above the point of attachment of the cable to the bed, no further movement is possible.

The forward and rear stop points of the slider will be vertically above the points of attachment of the cables to the bed.

It will be understood, of course, that modifications can be made in the structure of the sliding table which is illustrated and described herein without departing from the scope and purview of the invention as defined in the claims which follow.

I claim:

1. A sliding table for a workbench comprising:
a bed having means for attachment to a workbench;
a carriage movable relative to said bed;
a slider movable relative to said carriage and having means for supporting a piece of work;
means interconnecting said bed, said carriage and said slider and arranged and constructed to cause said carriage to move as said slider moves, wherein said interconnecting means is arranged and constructed such that for a given distance traveled by said slider, said carriage travels a lesser distance, wherein each of said bed and said slider is provided with a rail along which said carriage rolls and a pair of spaced apart end walls,
said sliding table further including a pulley rotatable relative to said carriage and a pair of cables, each said cable connected to and extending from a point on said bed at or adjacent to its said end wall, around said pulley and continuing to and connected to a second said point on said slider at or adjacent to its said end wall.

2. A sliding table for a workbench comprising:
a bed having means for attachment to a workbench;
a carriage movable relative to said bed;
a slider movable relative to said carriage and having means for supporting a piece of work;
wherein each of said bed and said slider is provided with a pair of guide rods along which said carriage slides and a pair of spaced apart end walls to which their respective said guide rods are affixed, said sliding table further including a pulley connected to said carriage and a pair of cables, each said cable connected to and extending from a separate said end wall of said bed, around said pulley and continuing to and connected to a separate and end wall of said slider.

3. The sliding table of claim 2 wherein said carriage has a central block and a bearing mount at opposite ends thereof, each said bearing mount having a plurality of openings through each of which a separate said guide rod of said bed and said slider extends, all of said guide rods being slidably received in said bearing mounts such that said carriage is movable relative to said guide rods.

* * * * *